United States Patent [19]
Dunfield et al.

[11] Patent Number: 5,579,188
[45] Date of Patent: Nov. 26, 1996

[54] IRONLESS SPINDLE MOTOR FOR DISC DRIVE

[75] Inventors: John C. Dunfield, Santa Cruz; Gunter K. Heine; Kamran Oveyssi, both of Aptos, all of Calif.; Marcel Jufer, Morges, Switzerland

[73] Assignee: Seagate Technology, Inc., Scotts Valley, Calif.

[21] Appl. No.: 469,643

[22] Filed: Jun. 6, 1995

[51] Int. Cl.⁶ .......................... G11B 17/04; G11B 17/08; H02K 21/12; H02K 5/16
[52] U.S. Cl. .................. 360/99.08; 310/90; 310/156; 360/98.01; 360/7
[58] Field of Search .................. 360/98.08, 98.07; 310/90, 156, 261, 180, 181, 184, 901; 318/689

[56] References Cited

U.S. PATENT DOCUMENTS

| | | | |
|---|---|---|---|
| 4,365,656 | 12/1982 | Takahasi | 140/92.1 |
| 4,468,578 | 8/1984 | Takahashi | 310/198 |
| 4,618,806 | 10/1986 | Grouse | 318/254 |
| 4,767,954 | 8/1988 | Phillips | 310/12 |
| 4,805,054 | 2/1989 | Kamoto et al. | 360/99.08 |
| 4,883,981 | 11/1989 | Gerfast | 310/40 R |
| 4,985,792 | 1/1991 | Moir | 360/99.08 |
| 5,031,061 | 7/1991 | Hatch | 360/98.08 |
| 5,070,289 | 12/1991 | Pona, Jr. | 318/689 |
| 5,142,173 | 8/1992 | Konno et al. | 310/90 |
| 5,323,076 | 6/1994 | Hajec | 310/90 |
| 5,331,244 | 7/1994 | Rabe | 310/156 |
| 5,345,130 | 9/1994 | Kliman et al. | 310/156 |
| 5,440,185 | 8/1995 | Allwine, Jr. | 310/156 |
| 5,510,664 | 4/1996 | Suzuki et al. | 310/156 |

FOREIGN PATENT DOCUMENTS 4-103076  8/1990  Japan.

*Primary Examiner*—A. J. Heinz
*Assistant Examiner*—Adriana Giordana
*Attorney, Agent, or Firm*—Westman, Champlin & Kelly, P.A.

[57] ABSTRACT

An "ironless" bearing spindle motor for rotating at least one disc about a central axis in a data storage device comprises a housing, a stationary member, a hub, and a stator. A rotor magnet is attached to the hub. A bearing interconnects the hub with the stationary member such that the hub and rotor magnet are rotatable about the central axis. The stator is coaxial with the hub and includes an ironless stator winding. The ironless stator winding minimizes low-harmonic acoustic vibration peaks in the spindle motor, resulting in a spindle motor having a very quiet operation.

24 Claims, 15 Drawing Sheets

IRONLESS SPINDLE MOTOR FOR DISC DRIVE

BACKGROUND OF THE INVENTION

The present invention relates generally to the field of spindle motors for disc drive data storage devices and, more particularly, to an "ironless" spindle motor.

Disc drive data storage devices, known as "Winchester" type disc drives, are well-known in the industry. In a Winchester disc drive, digital data is written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor.

The first Winchester disc drives to be produced were large cabinet models which included discs having a diameter of 14 inches and AC induction spindle motors. These types of disc drives were commonly located in dedicated "computer rooms" with large mainframe computers, where environmental factors such as temperature and humidity could be carefully controlled. In this type of environment, the acoustic noise generated by cooling fans and disc drive motors was of little concern, since the only persons directly in contact with the systems were maintenance personnel, who were generally not in the computer rooms for extended periods of time. The users of such systems were typically located at a remote location and communicated with the computer system via keyboards and display terminals which did not generate excessive amounts of acoustic noise.

More recently, personal computers have become more popular and are commonly located within the work space of the system user. This has prompted an increase in awareness of acoustic noise generated by the disc drives located within the personal computers. In certain markets, such as Europe, the amount of acoustic noise allowable in the work place is closely regulated. With this in mind, it has become common for system manufacturers to impose a "noise budget" on manufacturers of major system components, such as disc drives, which limits the amount of acoustic noise that such components can contribute to the overall noise of the system.

One of the principal sources of noise in disc drive data storage devices is the spindle motor which drives the discs at a constant speed. Typical spindle motor speeds have been in the range of 3600 RPM. Current technology has increased spindle motor speeds to 4800 RPM, 7200 RPM and above. Analysis of various types of disc drives has brought to light several different modes of acoustic noise generation which are attributable to the spindle motor and its control logic.

One mode of noise generation is axial and radial vibration in the stator and rotor. The vibrations are caused by rotation of the rotor mass and by electromagnetic disturbances generated during excitation of the stator by the application and removal of commutation pulses. The commutation pulses are timed, polarization-selected DC current pulses which are directed to sequentially selected stator windings to drive the motor and control its speed. Rapid rise and fall times of these pulses act as a striking force and set up sympathetic vibrations in the stator and rotor which generate resonant vibrations in the housing causing unacceptable levels of acoustic noise.

Prior art attempts to reduce or eliminate noise include controlling the resonant frequency of the housing, damping the vibration of the housing, resin bonding the stator to the base, and centering the stator axially and radially with respect to the rotor magnet. In U.S. Pat. No. 5,376,850, acoustic noise is reduced by uncoupling the stator from hard contact with the stationary portion of the shaft.

Disc drive manufacturers have recently begun looking at replacing conventional ball bearings in spindle motors with hydrodynamic bearings. Hydrodynamic bearings are much quieter and in general haver lower vibrations than conventional ball bearings. However, more complete solutions are desired to further reduce acoustic vibration levels in disc drive spindle motors.

SUMMARY OF THE INVENTION

The present invention is a disc drive data storage system having a motor with an "ironless" stator winding. The spindle motor includes a housing, a stationary member and a rotatable member. A bearing interconnects the rotatable member with the stationary member such that the rotatable member is rotatable about a central axis. A magnet is attached to the rotatable member and forms a portion of a rotor for the spindle motor. The "ironless" stator winding is coaxial with the rotor magnet and provides a rotating magnetic field which drives the rotor magnet.

In one embodiment, the spindle motor further includes a hydrodynamic bearing and a magnetic field focusing member or back-iron which is attached to the stator winding. The back-iron concentrates the magnetic flux that is generated by the stator winding. The stator winding is "ironless" in that the back-iron is external to the winding. There is no stator core or other magnetic material within the stator winding.

In another embodiment, the spindle motor includes first and second rotor magnets disposed about the stator winding. In yet another embodiment, the hydrodynamic bearing is integrated with the motor such that the bearing has a first bearing surface formed by the first rotor magnet and a second bearing surface formed by the stator winding.

The combination of the hydrodynamic bearing and the "ironless" stator winding reduces the forcing functions that give rise to pure tone vibrations in data storage disc drives. Hydrodynamic spindle motors are much quieter than spindle motors having mechanical bearings. It has been found through experiment, however, that pure tone vibrations become more noticeable in hydrodynamic spindle motors since the background vibration level is lower. The pure tone vibrations are no longer hidden in the background. With the "ironless" stator winding, permeance variations in the stator are significantly reduced, which reduces excitation of the pure tone vibrations. The result is a hydrodynamic spindle motor that is capable of very quiet operation.

BRIEF DESCRIPTION OF THE DRAWINGS

FIG. 8b illustrates windings between two pins in the winder fixture shown in FIG. 8a.

FIG. 8d is a top plan view of the winder fixture shown in FIG. 8a.

FIG. 18b illustrates the orientation of each wire loop of the winding shown in FIGS. 17 and 18a.

DETAILED DESCRIPTION OF THE PREFERRED EMBODIMENTS

Figure 1:
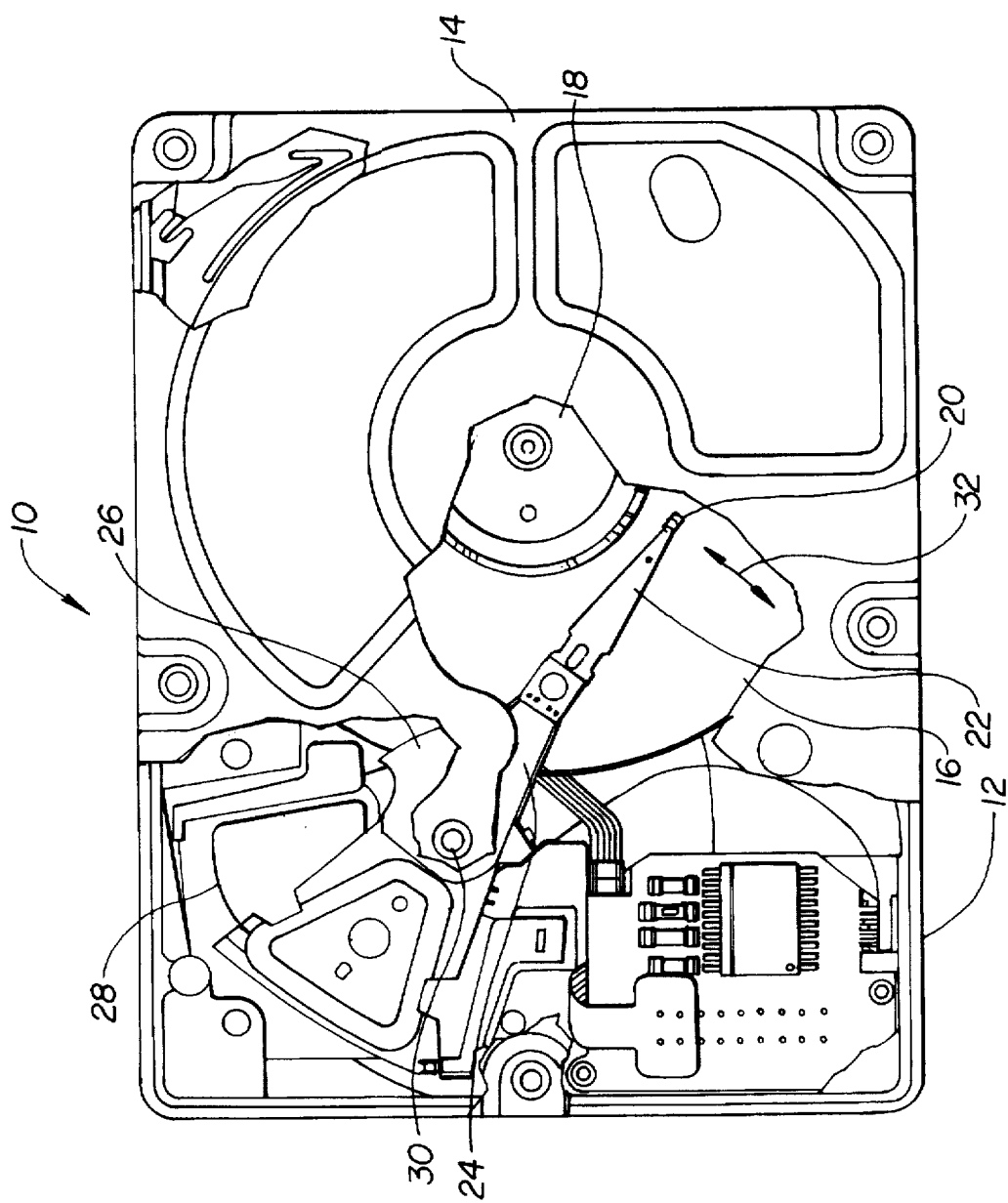
FIG. 1 is a top plan view of a disc drive data storage device, in accordance with the present invention.

The present invention is a disc drive data storage device having a hydrodynamic spindle motor with an "ironless" stator winding. FIG. 1 is a top plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the present invention is not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14.

Disc drive to further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the present invention is also useful in disc drives having other types of actuators, such as linear actuators.

Figure 2:
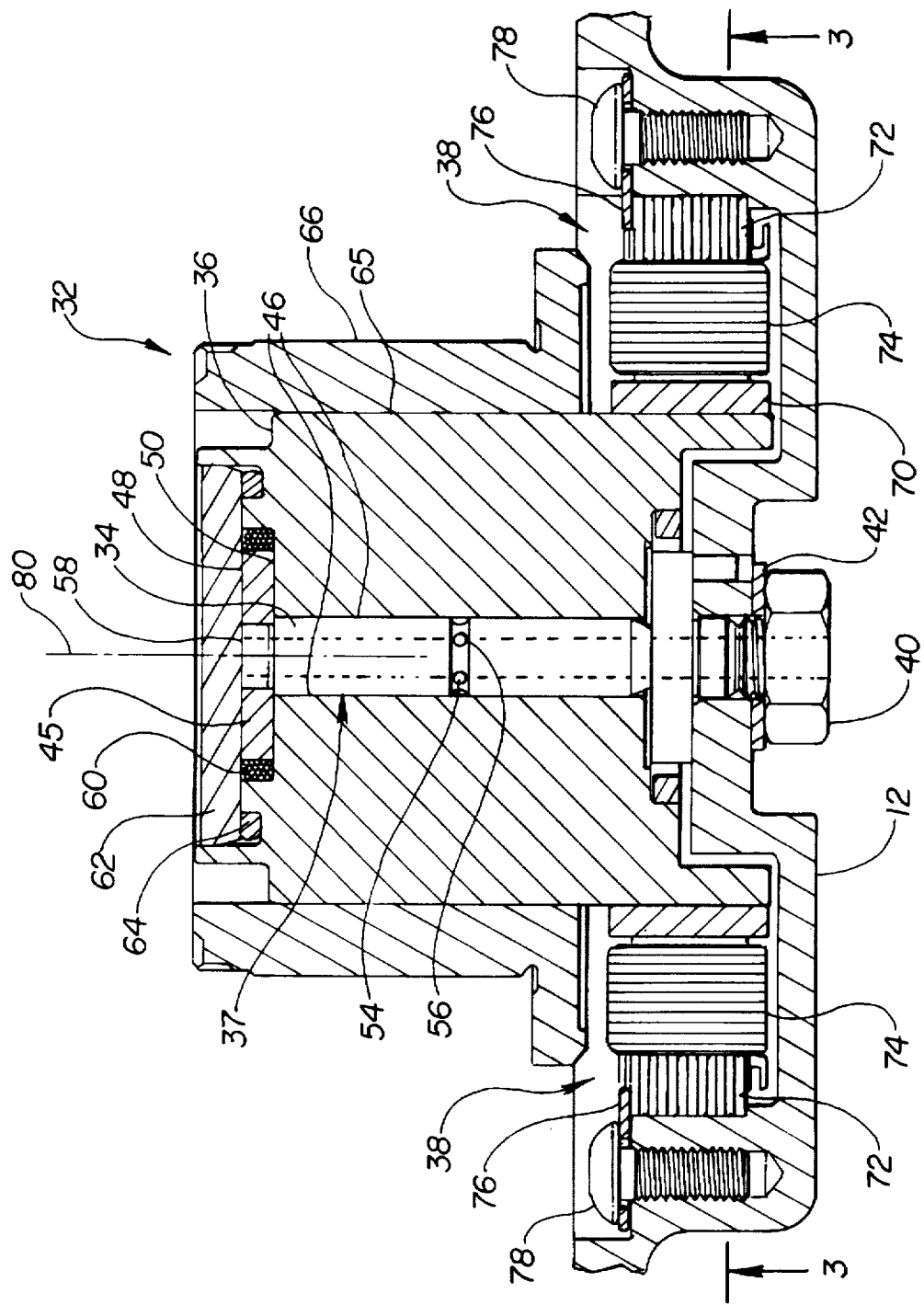
FIG. 2 is a sectional view of an ironless hydrodynamic spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes a radial working surface 46 and axial working surfaces 48 and 50. Shaft 34 includes fluid ports 54, 56 and 58 which supply hydrodynamic fluid 60 and assist in circulating the fluid along the working surfaces of the bearing. Hydrodynamic fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a central core 65 and a disc carrier member 66 which supports disc pack 16 (shown in FIG. 1)

for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets which are spaced about the periphery of hub 36. Rotor magnet 70 is magnetized to form one or more magnetic poles.

Stator 38 is attached to base 12 and includes a magnetic field focusing member or back-iron 72 and a stator winding 74. Stator winding 74 is attached to back-iron 72 between back-iron 72 and rotor magnet 70. Stator winding 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator winding 74 generate a rotating magnetic field which communicates with rotor magnet 70 and causes hub 36 to rotate about central axis 80 on bearing 37. The commutation pulses are timed, polarization-selected DC current pulses which are directed to sequentially selected stator windings to drive the rotor magnet and control its speed.

Back-iron 72 focuses the magnetic flux generated by stator winding 74 along the stator winding, toward rotor magnet 70. In the embodiment shown in FIG. 2, back-iron 72 is formed of a stack of twelve laminations. However, back-iron 72 can include any other suitable number of laminations, such as six laminations, or can have a solid construction. A solid construction is less expensive to manufacture but has greater magnetic losses than a laminated construction.

Stator winding 74 is "ironless" in that there is no stator core within the winding for completing the magnetic circuit. Rather, back-iron 72 is positioned external to winding 74.

In the embodiment shown in FIG. 2, spindle motor 32 is a "below-hub" type motor in which stator 38 is positioned below hub 36. Stator 38 also has a radial position that is external to hub 36, such that stator winding 74 is secured to an inner diameter surface 82 of back-iron 72.

Figure 3:
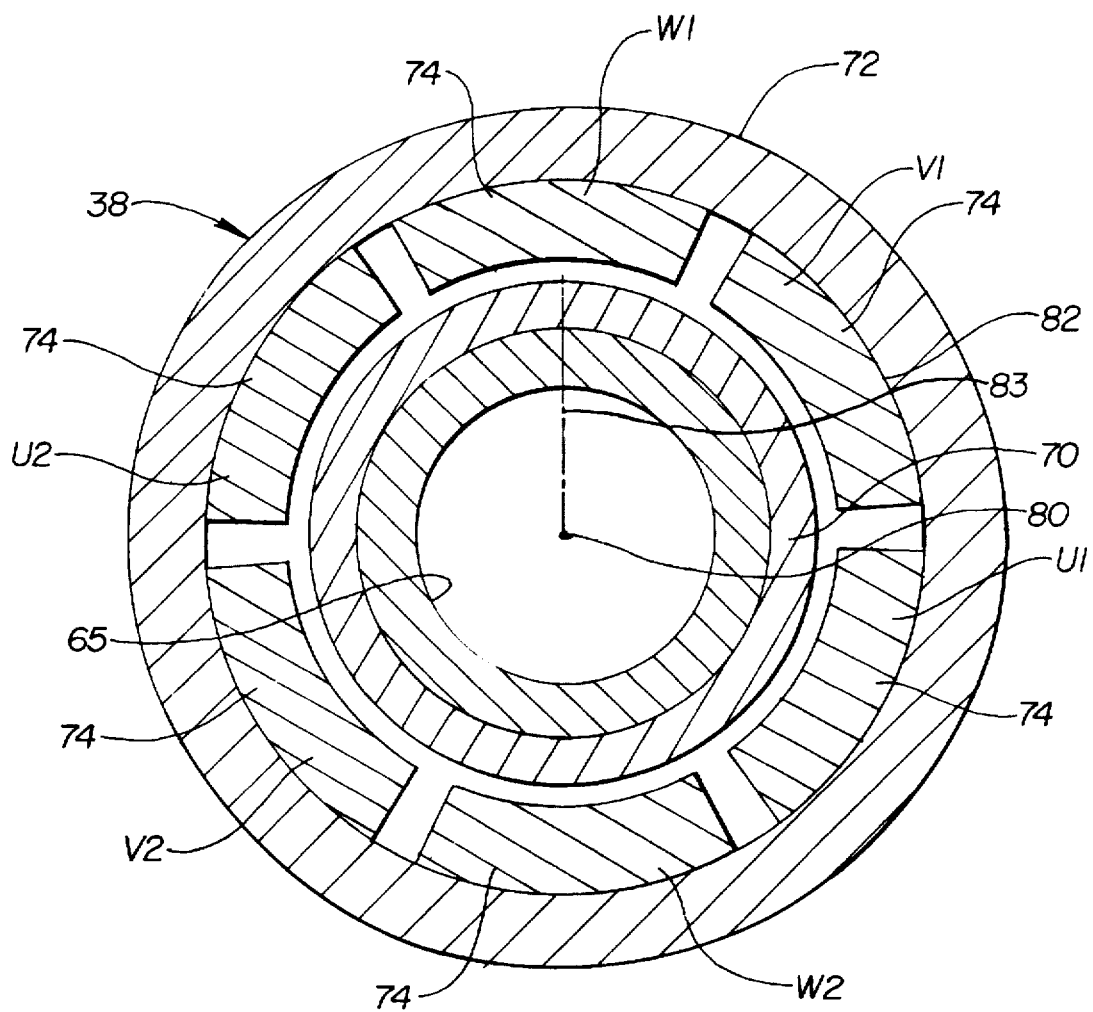
FIG. 3 is a diagrammatic sectional view of the hydrodynamic spindle motor taken along line 3—3 of FIG. 2, with portions removed for clarity.
Figure 4:
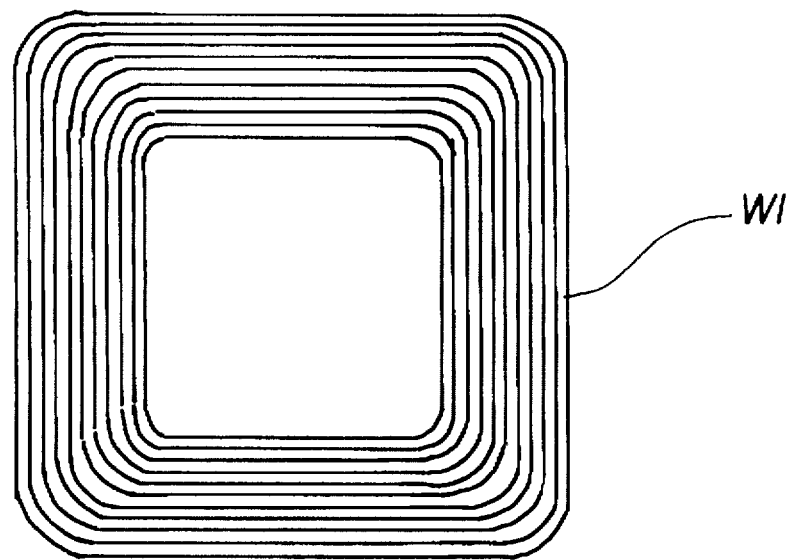
FIG. 4 is side plan view of a stator phase winding in the hydrodynamic spindle motor, as viewed in a radial direction.

FIG. 3 is a diagrammatic sectional view of hydrodynamic spindle motor 32 taken along line 3—3 of FIG. 2, with portions removed for clarity. Stator 38 includes back-iron 72 and stator winding 74, which are coaxial with rotor magnet 70 and central core 65. Stator winding 74 includes phase windings W1, V1, U1, W2, V2 and U2 which are attached to inner diameter surface 82 of back-iron 72. The phase windings are formed of coils which have a coil axis that is normal to and intersects central axis 80. For example, phase winding W1 has a coil axis 83 which is normal to central axis 80. FIG. 4 is a side plan view of phase winding W1 as viewed in a radial direction. As shown in FIG. 4, phase winding W1 is wound in a circular or rectangular fashion as a concentrated bundle.

Figure 5:
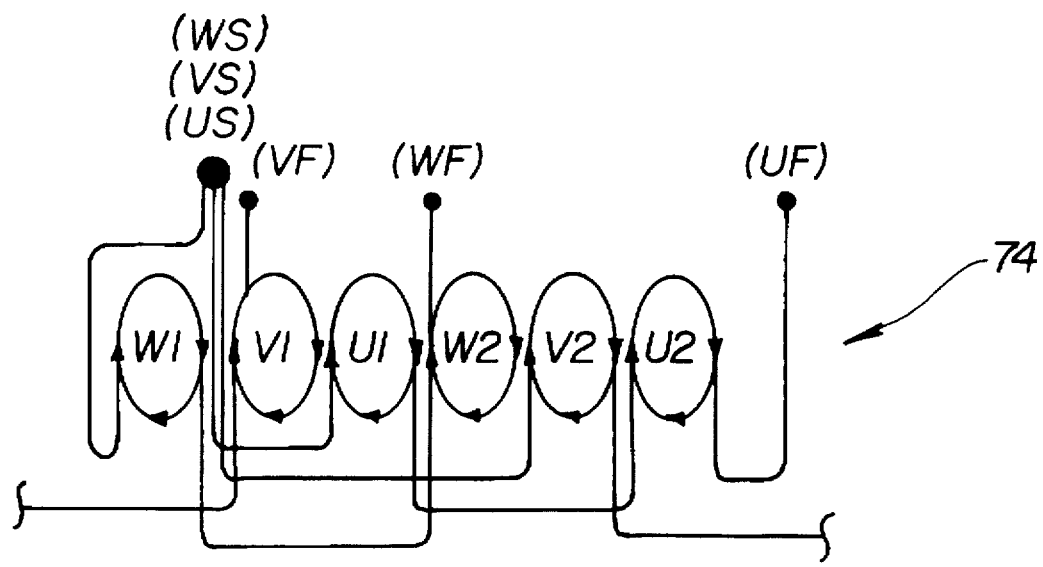
FIG. 5 is a winding diagram of the stator windings shown in FIGS. 2 and 3.

FIG. 5 is a winding diagram of stator winding 74, as viewed if it were laid out flat. The start of each winding is labeled WS, VS and US. The finish of each winding is labeled WF, VF and UF. Stator winding 74 is a two-pole, three-phase winding in which the windings in each phase are electrically connected in series. In an alternative embodiment, the windings in each phase are connected in parallel. Although stator winding 74 is shown in FIGS. 2, 3 and 5 as including two poles and three phases, other suitable numbers of poles and phases can also be used with the present invention. For example, stator winding 74 can include more poles such as four, six or eight poles.

Figure 6:
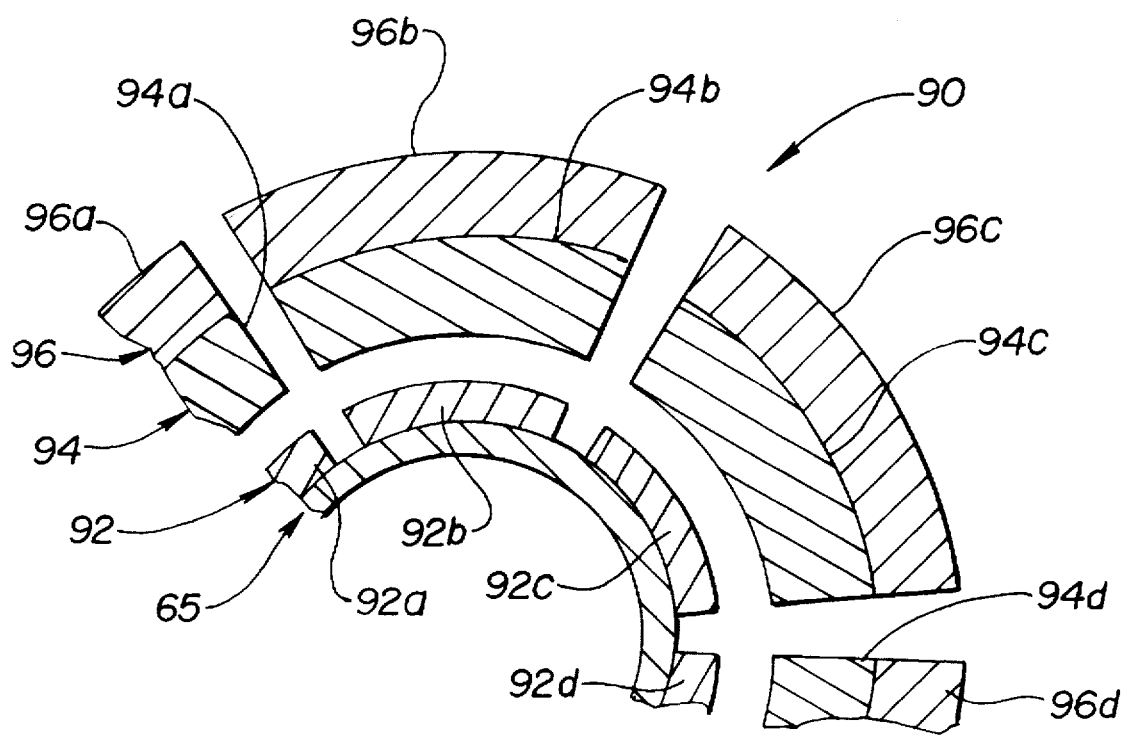
FIG. 6 is a fragmentary view of a hydrodynamic spindle motor having an alternative back-iron and rotor magnet configuration.

Back-iron 72 can be formed as a unitary, annular ring, as shown in FIG. 2, or can be formed of a plurality of back-iron sections, with each section being associated with a particular stator winding 74. FIG. 6 is a fragmentary sectional view of an alternative embodiment in which the back-iron and rotor magnet are separated into a plurality of sections. Hydrodynamic spindle motor 90 includes a rotor magnet 92, a stator winding 94 and a back-iron 96. Rotor magnet 92 has a plurality of magnet sections, including sections 92a, 92b, 92c and 92d. Magnet sections 92a, 92b, 92c and 92d are carried by hub central core 65 and are arranged about the hub's periphery to form a plurality of magnetic poles.

Stator winding 94 has a plurality of phase windings, including windings 94a, 94b, 94c and 94d, which are similar to the phase windings of stator winding 74 shown in FIG. 3. Back-iron 96 is formed of a plurality of sections, including sections 96a, 96b, 96c and 96d. Sections 96a, 96b, 96c and 96d are attached to associated phase windings 94a, 94b, 94c and 94d, respectively.

Figure 7:
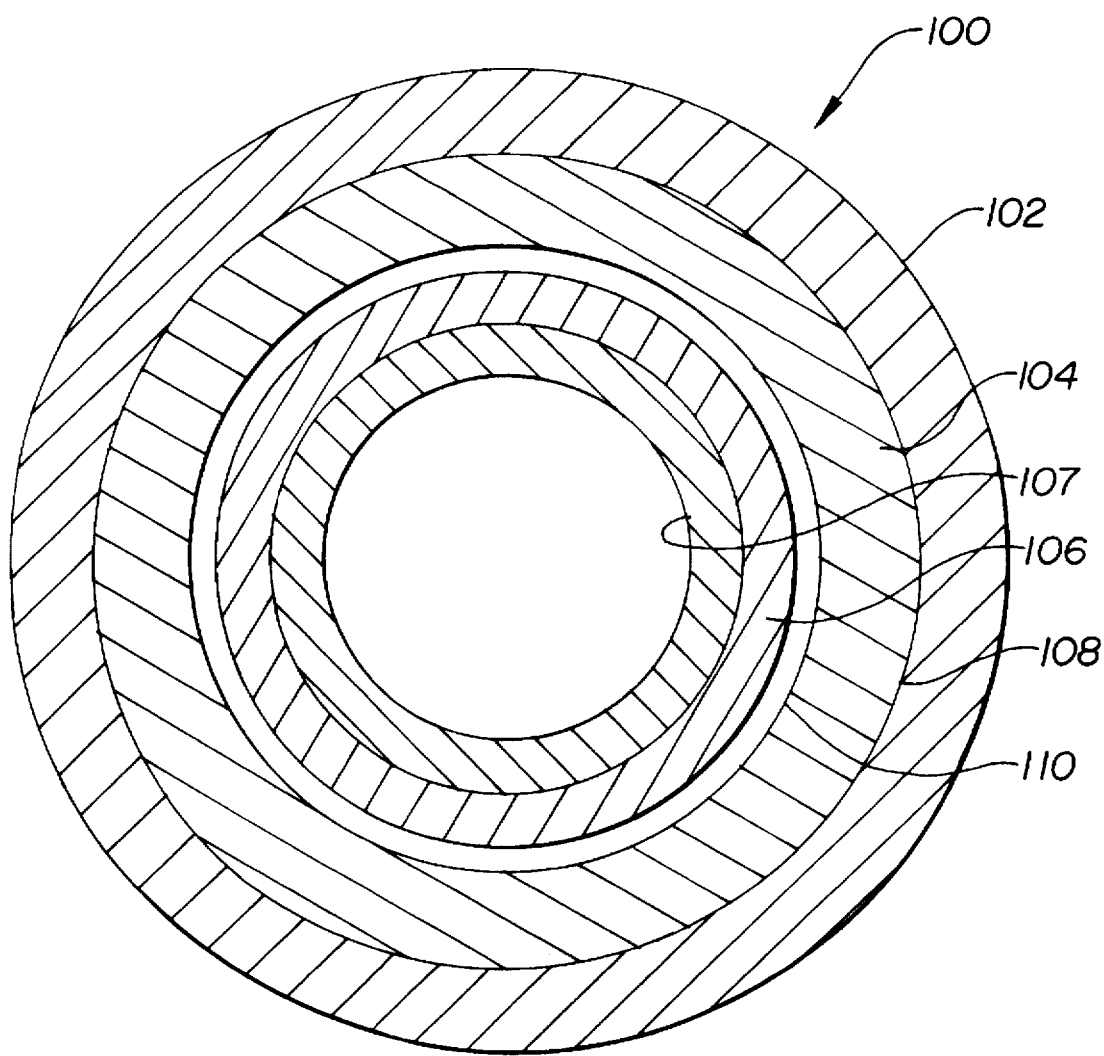
FIG. 7 is diagrammatic sectional view of a hydrodynamic spindle motor having a "basket weave" stator winding in accordance with the present invention.

The stator winding is not limited to the separate, concentrated windings shown in FIGS. 2–6. For example, FIG. 7 is a diagrammatic sectional view of a hydrodynamic bearing spindle motor having a stator winding with a "basket weave" arrangement. Spindle motor 100 includes back-iron 102, stator winding 104, permanent magnet 106 and hub central core 107. With the basket weave arrangement, stator winding 104 has a cylindrical shape which is formed of a plurality of interwoven phase windings. Stator winding 104 has an outer diameter 108 and an inner diameter 110. The phase windings are wound adjacent to one another in the cylinder.

Figure 8A:
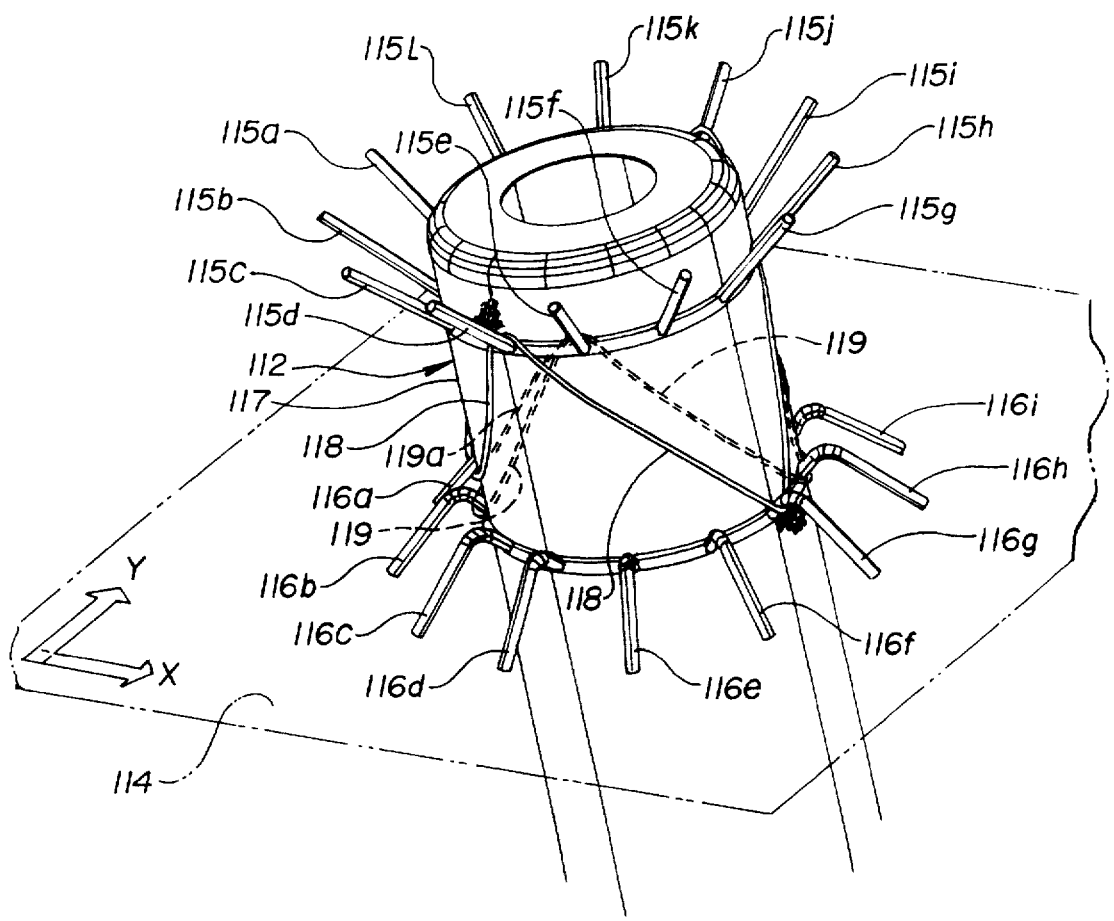
FIG. 8a is a perspective view of a winder fixture for the basket weave stator winding shown in FIG. 7.

FIG. 8a is a computer model of a winder fixture for the ironless basket weave stator winding shown in FIG. 7. Fixture 112 is shown with respect to an X-Y plane 114. Fixture 112 includes twelve top pins 115a–115l, and twelve bottom pins 116a–116l (116j–116l not shown). Pins 115a–115l and 116a–116l are retractable steel pins mounted on a mandrel 117 which is formed of aluminum or surgical steel, for example.

Each phase winding includes N turns, with N–1 turns distributed over one or more pins. Each turn includes an individual wire which is wound around winder fixture 112. One turn is used as a transition from one pin to the next when the turns of a particular phase winding are distributed over more than one pin. For example, FIG. 8a shows a phase winding having turns 118 and 119 that are distributed over two pins. Turn 118 (solid line) begins at bottom pin 116a and is wound over top pin 115d, under bottom pin 116g, over top pin 115j and then under bottom pin 116a. Turn 119 includes a transition turn 119a which begins at bottom pin 116a and then is wound over top pin 115e, under bottom pin 116h, over top pin 115k, under bottom pin 116b and then again over top pin 115e. The resulting stator winding has an inner diameter which is equal to the outer diameter of mandrel 117.

The orientation of pins 115a–115l and 116a–116l are selected so that wire crossings occur near the pins and not at a midpoint between the top and bottom pins. As shown in FIG. 8a, both top pins 115a–115l and the bottom pins 116a–116l are oriented upward adjacent mandrel 117. Several alternative pin configurations and pin numbers are possible, and can be adjusted according to the number of poles in the motor and the number of phases.

Figure 8B:
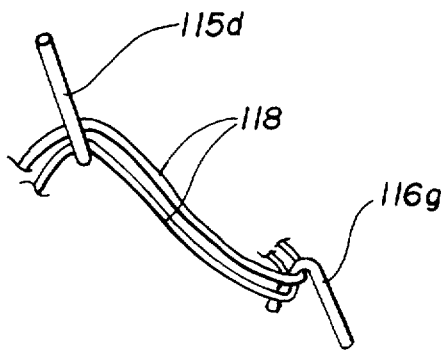
Figure 8C:
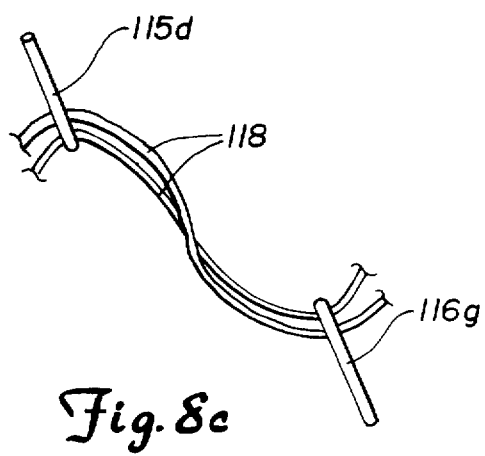
FIG. 8c illustrates the windings between two pins in an alternative winder fixture.

FIG. 8b shows the wire crossing between top pin 115d and bottom pin 116g in more detail. Since both pins are oriented upward, individual turns 118a and 118b extend substantially parallel to one another between top pin 115d and bottom pin 116g. In contrast, FIG. 8c illustrates that the wire crossing occurs at a midpoint if pin 115d is oriented upward and pin 115g were oriented downward adjacent the mandrel.

Figure 8D:
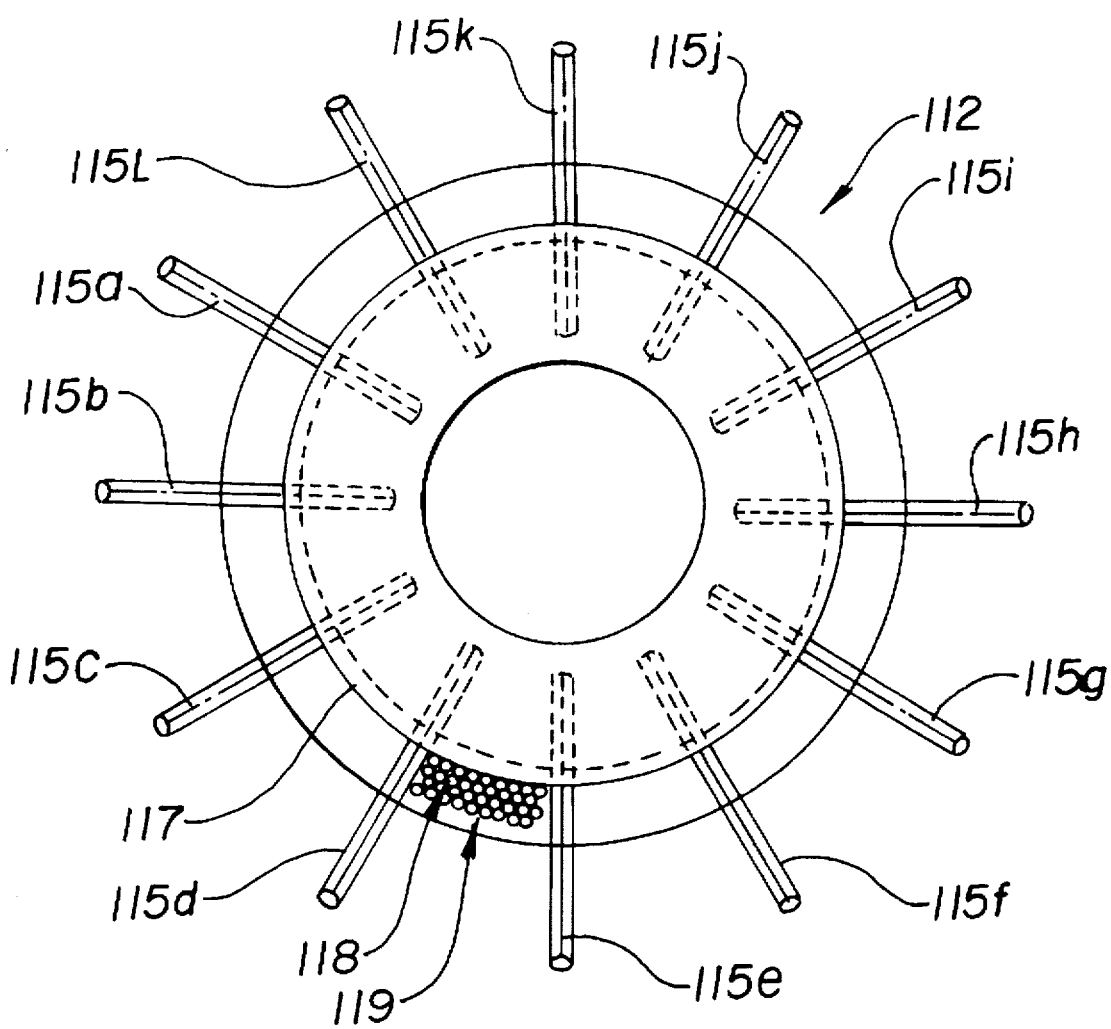

FIG. 8d is a top plan view of winder fixture 112. FIG. 8d illustrates the wire layers between pins 115d and 115e. Turns 118 are wound over pin 115d and turns 119 are wound over pin 115e. In this embodiment, the resulting stator winding has four layers, with two layers of turns 118 and two layers of turns 119. Each layer has nine turns. Since there are twelve top pins and twelve bottom pins, there are a total of 216 turns in the stator winding. In one embodiment, fixture 112 has a height of 20 mm and a diameter of 15.8 mm. The remaining phase windings are wound in a similar fashion.

Figure 9:
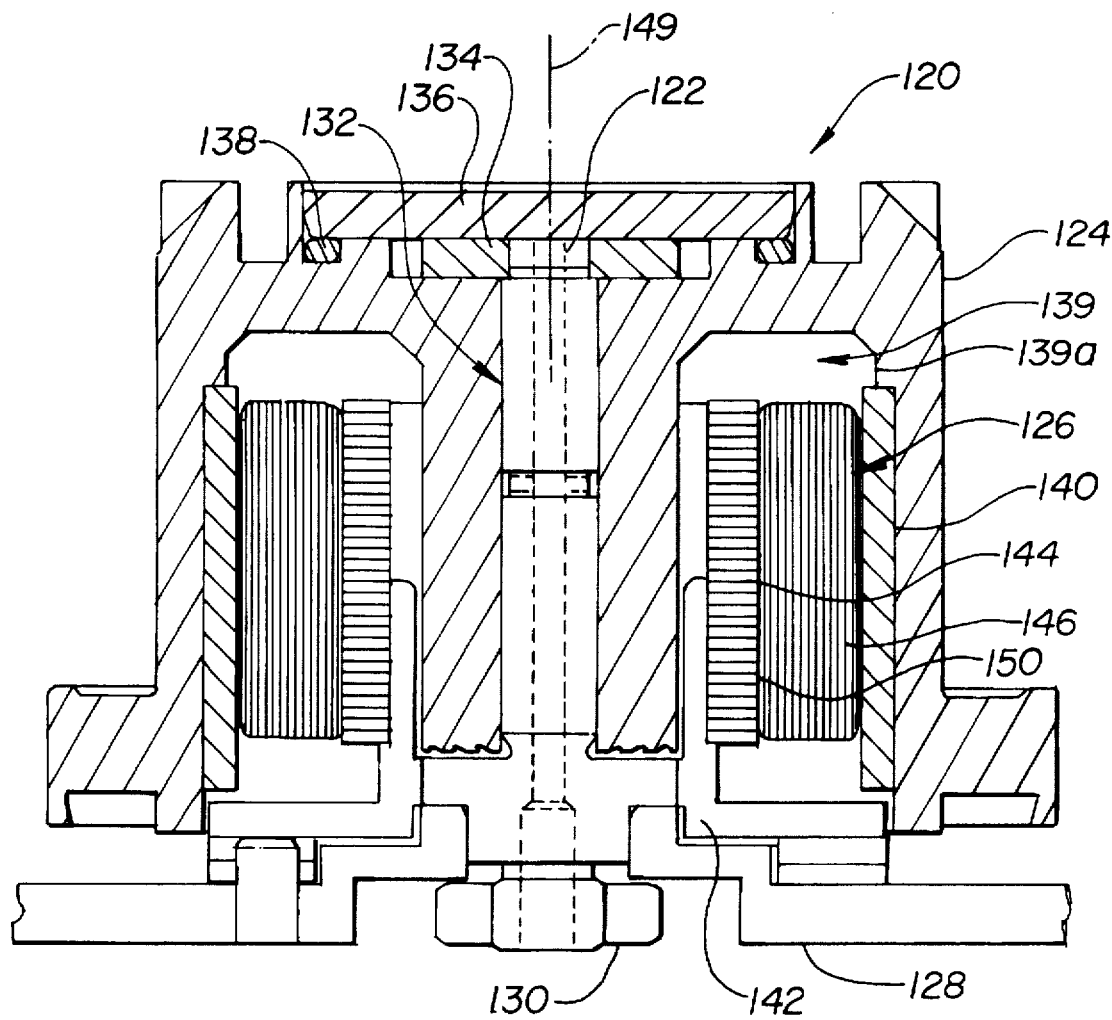
FIG. 9 is a sectional view of a hydrodynamic bearing spindle motor in which the stator winding is positioned internal to the hub and the rotor magnet is positioned external to the stator winding, in accordance with the present invention.

FIG. 9 is a sectional view of a hydrodynamic bearing spindle motor in which the stator winding is internal to the hub and the rotor magnet is external to the stator winding, in accordance with the present invention. Spindle motor 120 includes a stationary shaft 122, a hub 124 and a stator 126. Shaft 122 is attached to base 128 through a nut 130. Hub 124 is interconnected with shaft 122 through a hydrodynamic bearing 132 for rotation about shaft 122.

Spindle motor 120 further includes a thrust bearing 134 and a counterplate 136. An O-ring 138 is provided between counterplate 136 and hub 124 to seal the hydrodynamic bearing 132. Hub 124 has an internal cavity 139 with an outer diameter 139a which carries a permanent magnet 140. Magnet 140 acts as a rotor for spindle motor 120 and is positioned external to stator 126 with respect to a central axis 149.

Figure 10:
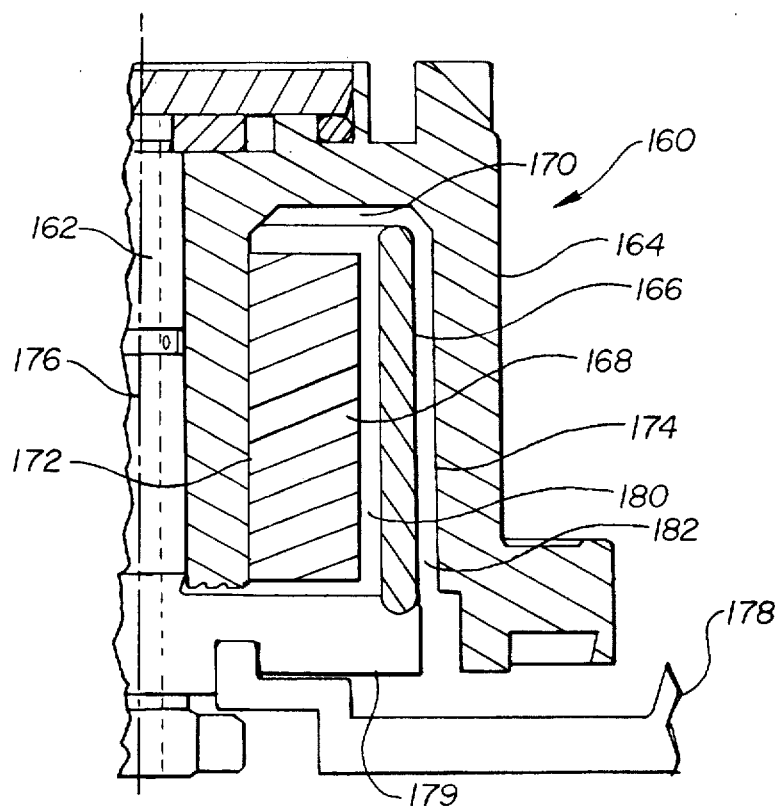
FIG. 10 is a partial sectional view of a hydrodynamic bearing spindle motor in which the rotor magnet is positioned internal to the stator winding.

Stator 126 is attached to shaft 122 through a snap-ring 142. Stator 126 includes a back-iron 144 and a stator winding 146. Back-iron 144 is in the form of an annular ring and includes a plurality of laminations. Stator winding 146 can be formed of a plurality of concentrated windings, as shown in FIGS. 3 and 4, or as a basket weave as shown in FIGS. 7-8, for example. Stator winding 146 is attached to an outer diameter surface 150 of back-iron 144, between back-iron 144 and permanent magnet 140. In the embodiment shown in FIG. 9, stator 126 has an axial position along central axis 149 that is within hub 124. Stator 126 has a radial position with respect to central axis 149 that is internal to permanent magnet 140. Since there is no stator core within stator winding 146, stator winding 146 is ironless, FIG. 10 is a partial sectional view of a hydrodynamic bearing spindle motor 160 in which the rotor magnet is positioned internal to the stator winding. For simplicity, FIG. 10 illustrates only one half of the symmetrical spindle motor 160. Spindle motor 160 includes a stationary shaft 162, a hub 164, a stator winding 166 and a rotor magnet 168. Hub 164 includes an internal cavity 170 having an inner diameter 172 and an outer diameter 174 with respect to a central axis 176. Rotor magnet 168 is carried by hub 164 and is attached to inner diameter 172. Stator winding 166 is an ironless, basket weave stator winding which has no stator lamination. Stator winding 166 has a radial position with respect to central axis 176 that is external to rotor magnet 172 and internal to outer diameter 174 of internal cavity 170. Stator winding 166 has an axial position along central axis 176 that is within internal cavity 170. Stator winding 166 is attached to housing 178 through a member 179.

In the embodiment shown in FIG. 10, there are two air gaps 180 and 182. Air gap 180 is positioned between stator winding 166 and magnet 168, while air gap 182 is positioned between stator winding 166 and hub 164. Hub 164 acts as a back-iron for the magnetic field generated in stator winding 166.

Figure 11:
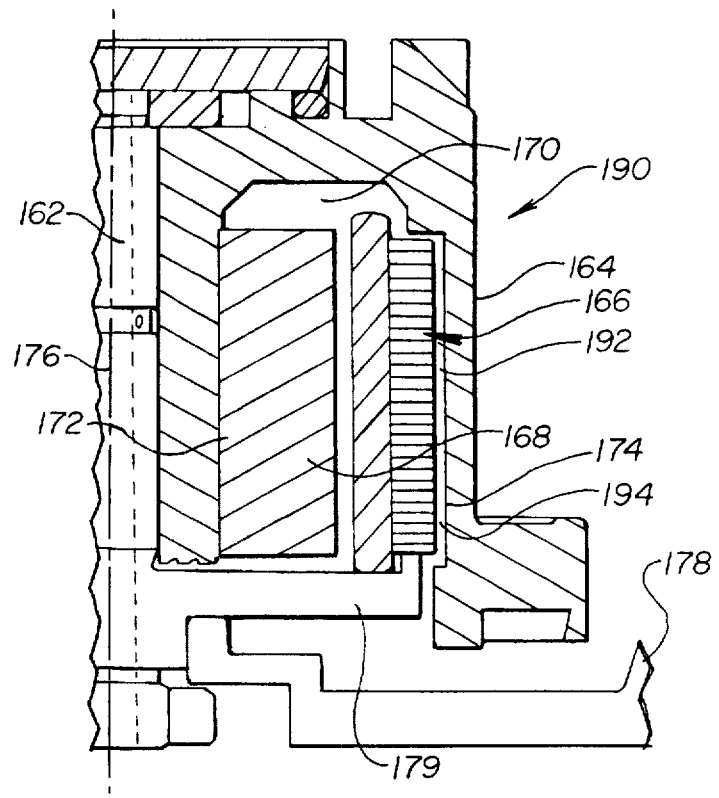
FIG. 11 is a partial sectional view of a hydrodynamic bearing spindle motor which further includes a stator lamination attached to the stator winding.

FIG. 11 is a partial sectional view of a hydrodynamic bearing spindle motor 190 which is similar to spindle motor 160 shown in FIG. 9 but which further includes a stator lamination 192. The same reference numerals are used in FIGS. 10 and 11 to indicate common elements. Stator lamination 192 is attached to stator winding 166 and is positioned external to stator winding 166 with respect to central axis 176. In the embodiment shown in FIG. 11, there is one air gap 194 positioned between stator winding 166 and rotor magnet 168.

Figure 12:
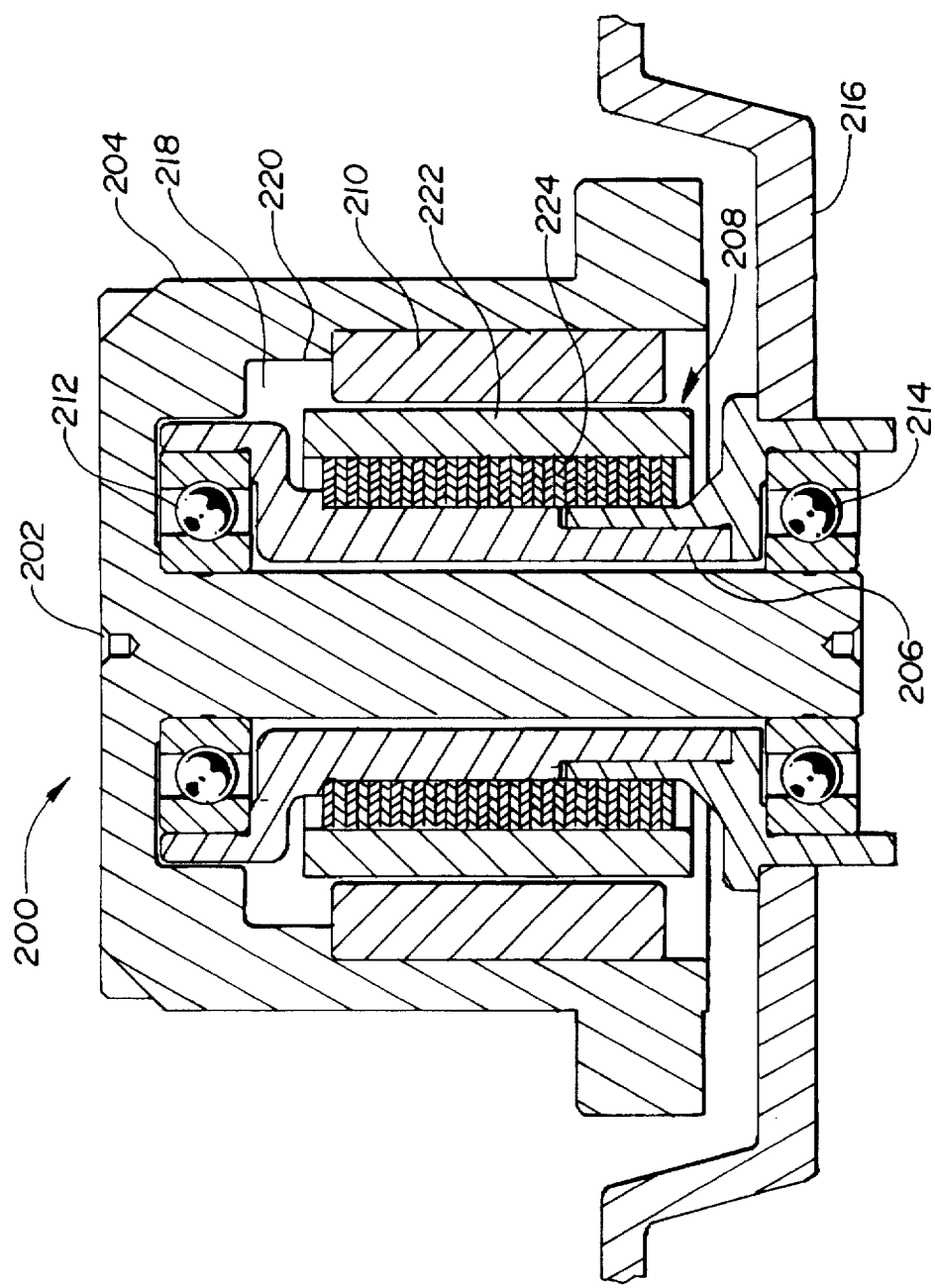
FIG. 12 is a sectional view of a spindle motor having ball bearings and an ironless stator winding, in accordance with the present invention.

The ironless stator winding of the present invention is not limited to disc drive spindle motors having hydrodynamic bearings. FIG. 12 is a sectional view of a spindle motor having ball bearings and an ironless stator winding, in accordance with the present invention. Spindle motor 200 includes a central axis 202, a hub 204, a stationary member 206, a stator 208 and a rotor magnet 210. Ball bearings 212 and 214 interconnect hub 204 with stationary member 206 such that hub 204 is rotatable about central axis 202. Stationary member 206 is secured to a housing 216.

Hub 204 includes an inner cavity 218 having an outer diameter 220 with respect to central axis 202. Rotor magnet 210 is carried by hub 204 and is attached to outer diameter 220. Stator 208 includes an ironless stator winding 222 and a stator lamination 224. Stator lamination 224 is secured to stationary member 206. Ironless stator winding 222 is attached to stator lamination 224 and, in this embodiment, is wound in a basket weave arrangement. Ironless stator winding 222 is positioned internal to rotor magnet 210 with respect to central axis 202 and is positioned between stator lamination 224 and rotor magnet 210 such that stator lamination 224 focuses a magnetic field generated by the winding 222 toward rotor magnet 210.

Various other configurations of spindle motors having ball bearings can be used in accordance with the present invention. The ball bearings can be located at different positions, the stator can be positioned within the hub or below the hub, and the stator can be positioned at various positions with respect to the rotor magnet.

Figure 13:
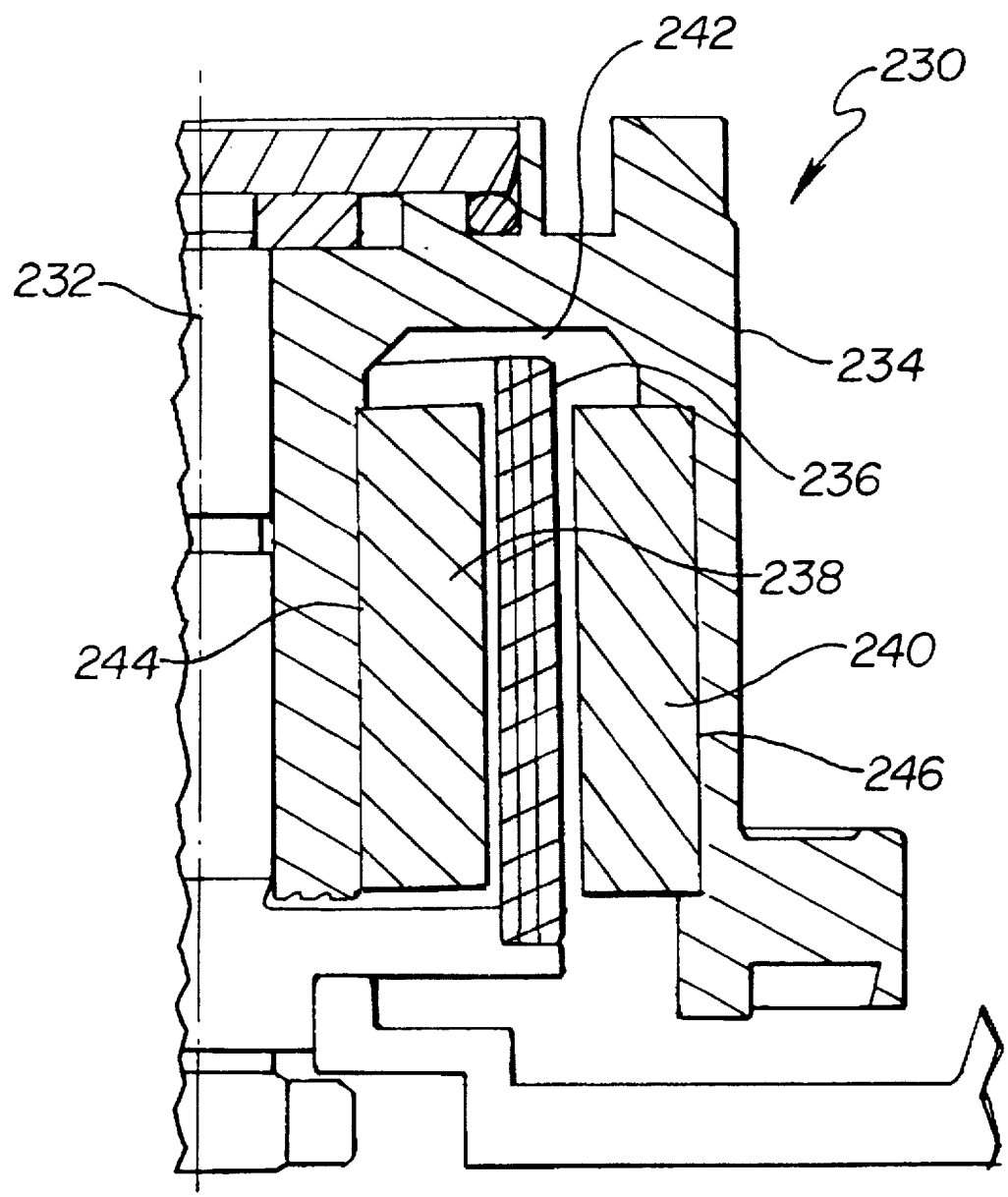
FIG. 13 is a partial sectional view of a hydrodynamic bearing spindle motor having inside and outside rotor magnets disposed about the stator winding.

FIG. 13 is a partial sectional view of a hydrodynamic bearing spindle motor having inside and outside rotor magnets disposed about the stator winding. Spindle motor 230 includes a central axis 232, a rotor 234, an ironless stator winding 236 and rotor magnets 238 and 240. Rotor 234 has an internal cavity 242 with an inner diameter 244 and an outer diameter 246. Magnet 238 is attached to inner diameter 244 and magnet 240 is attached to outer diameter 246 of internal cavity 242. Ironless stator winding 236 has a radial position with respect to central axis 232 that is external to magnet 238 and internal to magnet 240. Ironless stator winding 236 has an axial position along central axis 232 that is within internal cavity 242. Ironless stator winding 236 is wound in a basket weave arrangement, for example.

Figure 14:
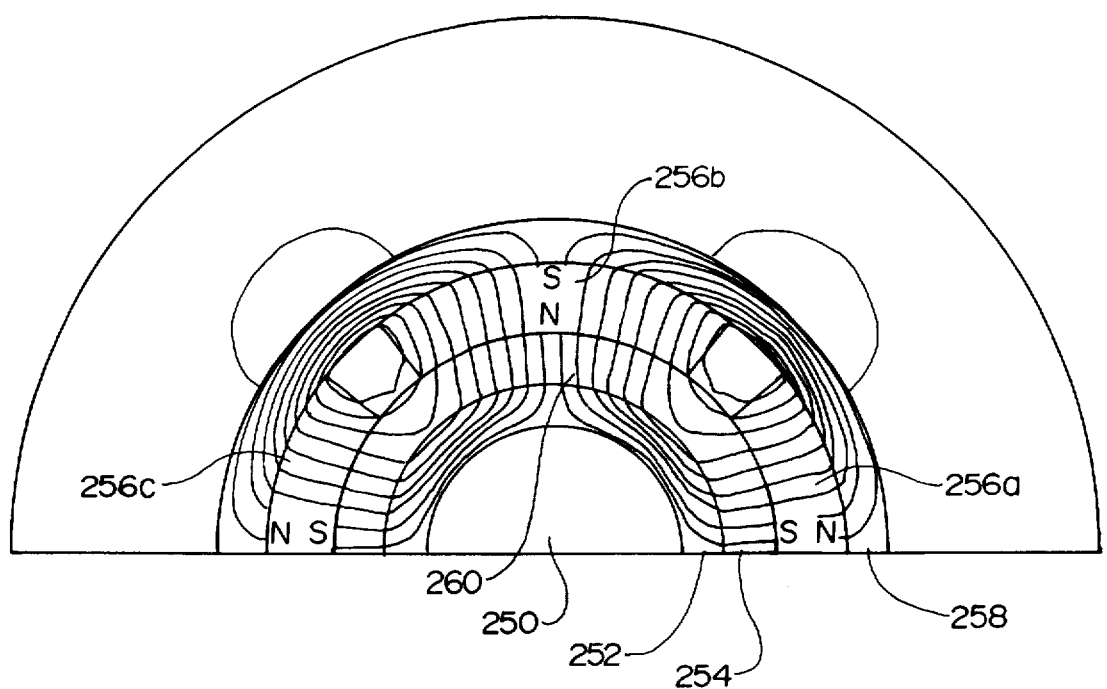
FIG. 14 is a plot illustrating the magnetic lines of flux for a motor having an ironless basket weave stator winding and an outside rotor magnet.

FIG. 14 illustrates the magnetic lines of flux generated by one half of a spindle motor having an ironless, basket weave stator winding and an outside rotor magnet. The motor includes air gap 250, ironless stator winding 252, air gap 254, a multipolar rotor magnet formed by magnets 256a, 256b and 256c, and hub (back-iron) 258. "N" and "S" indicate the north and south poles of magnets 256, 258 and 260. The magnetic lines of flux in air gap 254, which are seen by stator winding 252, are shown generally at 260.

Finite element magnet modeling has shown that motor constants $K_m$ and $K_t$ for the embodiment shown in FIG. 14 can be equal to the motor constants of a motor having the same general dimensions but with a toothed stator and stator windings wound around the teeth, where:

$$K_m = \frac{torque}{\sqrt{power}} \qquad K_t = \frac{torque}{current}$$

However, the magnetic field is dispersed such that only the nearest stator coils to a particular magnet pole see a high radial magnetic flux. In contrast, the addition of a second magnet of reverse polarity on the other side of the stator winding significantly improves the flux dispersion and increases the motor $K_m$ even if the combined thickness of the two magnets is equal to the thickness of the single magnetic ring shown in FIG. 14.

Figure 15:
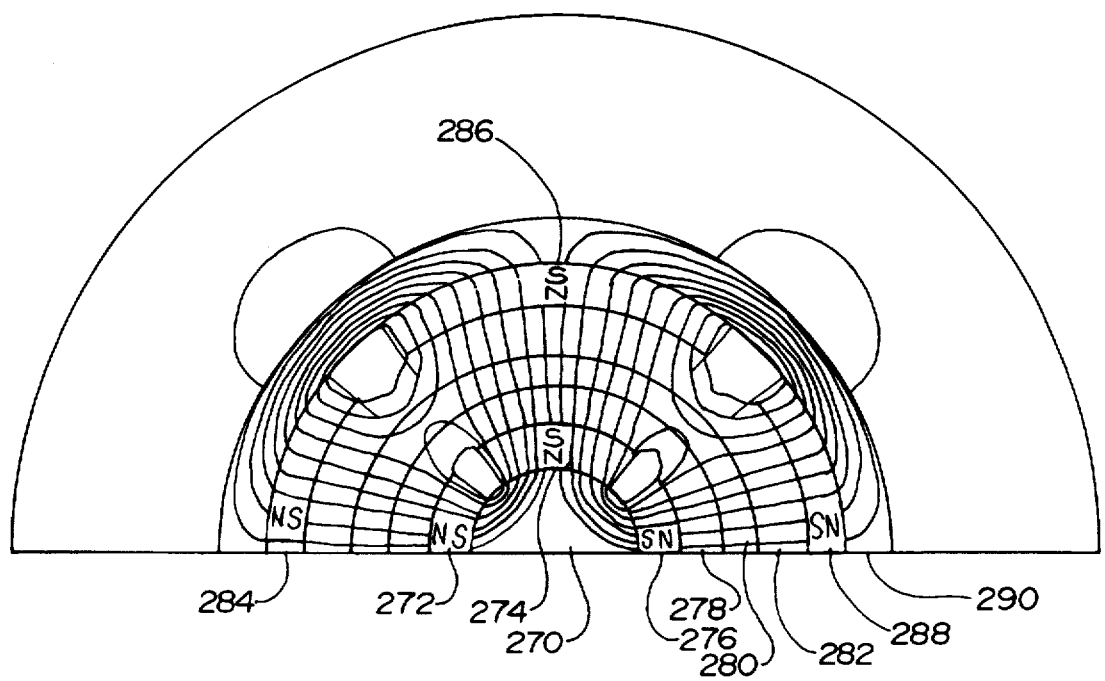
FIG. 15 is a plot illustrating the magnetic lines of flux for a motor having an ironless basket weave stator winding and inside and outside rotor magnets disposed about the stator winding.

FIG. 15 illustrates the magnetic lines of flux generated in an embodiment having two magnetic rings. In FIG. 15, the spindle motor includes an inner hub portion 270, an inner rotor magnet formed by magnets 272, 274 and 276, an air gap 278, an ironless stator winding 280, an air gap 282, an outer rotor magnet formed by magnets 284, 286 and 288, and an outer hub portion 290. Inner and outer hub portions 270 and 290 operate as back-irons to focus the magnetic field in a radial direction.

As shown in FIG. 15, the magnetic lines of flux seen by ironless stator winding 280 are more in the radial direction and evenly dispersed than in FIG. 14. In an alternative embodiment, offsets can be introduced in the transition zones of the magnets during alignment to give the magnets a more "sinusoidal" magnetomotive force (mmf) distribution, but at the expense of a loss of $K_m$.

Figure 16:
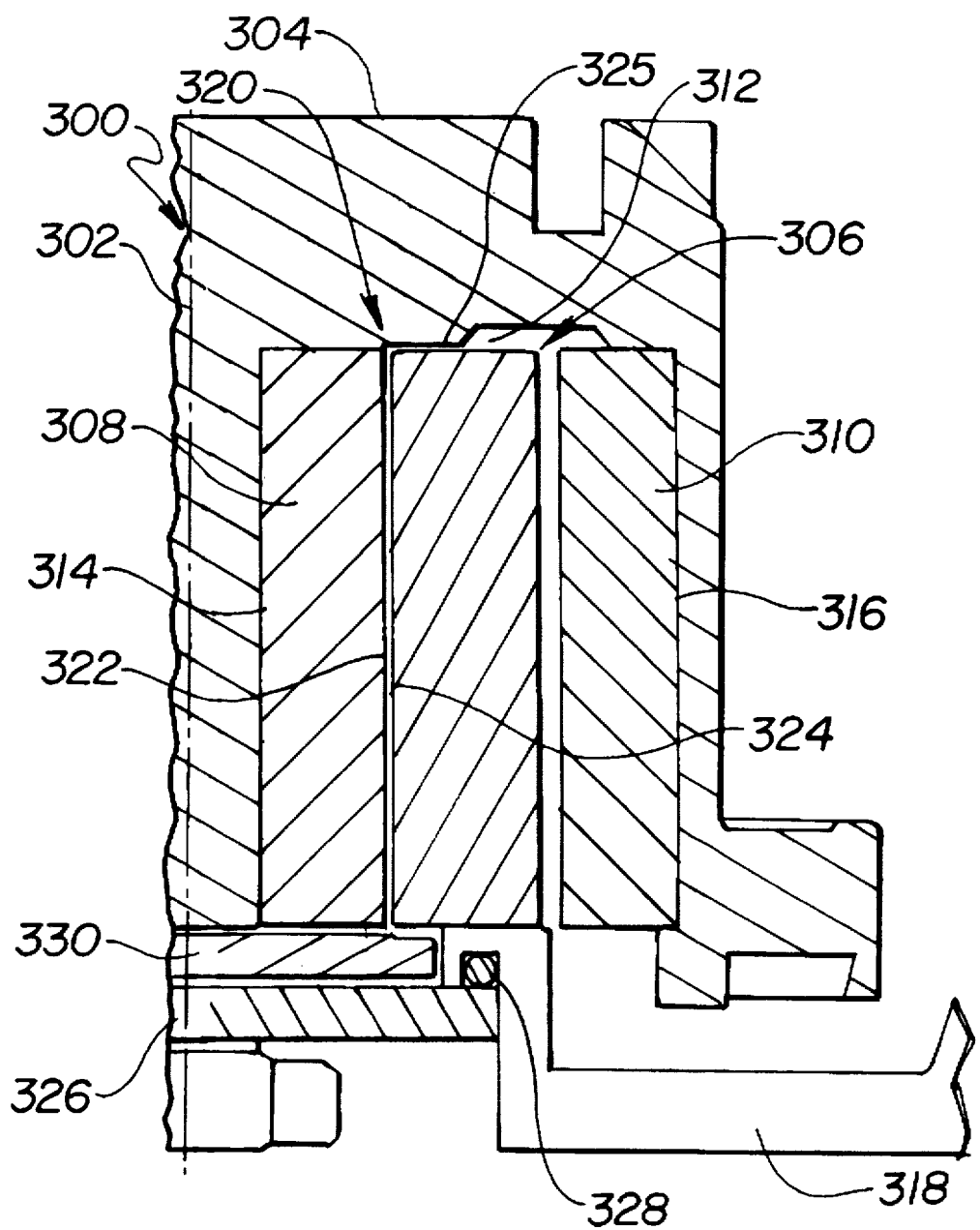
FIG. 16 is a partial sectional view of a hydrodynamic bearing spindle motor in which the hydrodynamic bearing is integrated with the motor.

FIG. 16 is a partial, sectional view of an alternative embodiment in which the hydrodynamic bearing is integrated with the stator winding and one of the rotor magnets. Disc drive spindle motor 300 includes a central axis 302, a hub 304, an ironless stator winding 306 and rotor magnets 308 and 310. Hub 304 is rotatable about central axis 302 and has an internal cavity 312 with an inner diameter 314 and an outer diameter 316. Rotor magnet 308 is attached to inner diameter 314 and rotor magnet 310 is attached to outer diameter 316. Stator winding 306 is over-molded with a rubber-like material and is fixed with respect to housing 318. The winding has a basket weave or a concentrated bundle arrangement, for example.

A hydrodynamic bearing journal 320 is formed between stator winding 306 and rotor magnet 308. Surface 322 of rotor magnet 308 forms a first hydrodynamic bearing surface while surface 324 of the over-molded stator winding 306 forms a second hydrodynamic bearing surface. Suitable bearing tolerances can be achieved by forming rotor magnet 308 out of a material such a ferrite, for example. Either air or oil can be used for the bearing fluid. A capillary seal 325 is positioned between hub 304 and stator winding 306 to overcome centrifugal forces and retain the fluid within the bearing journal 320.

In one embodiment, stator winding 306 is over-molded with 50 Durometer rubber material such as Viton$^{TM}$, a polymer product of E. I. Du Pont de Nemours Co., of Wilmington, Del. The rubber is over-molded in a vulcanizing process in which the material flows over the stator winding to form the desired molded features and is then hardened at a selected temperature and pressure. The over-molding and vulcanizing process is controlled to provide desired stiffness characteristics. Other suitable material, such as plastic, can also be used to over-mold stator winding 306. The over-molding can be limited to surface 324 or can cover the entire stator winding. The over-molding of stator winding 306 provides suitable tolerances at the other bearing surface.

Spindle motor 300 further includes a counterplate 326, an O-ring seal 328 and a rotating thrust plate 330. Thrust plate 330 is formed of steel, for example. Integrating the hydrodynamic bearing with the rotor magnet and the stator winding simplifies the motor design and therefore reduces construction costs of the motor.

In an alternative embodiment (not shown), spindle motor 300 includes two sets of integrated hydrodynamic journals, with one journal formed between stator winding 306 and rotor magnet 308 and one journal formed between stator winding 306 and rotor magnet 310.

Figure 17:
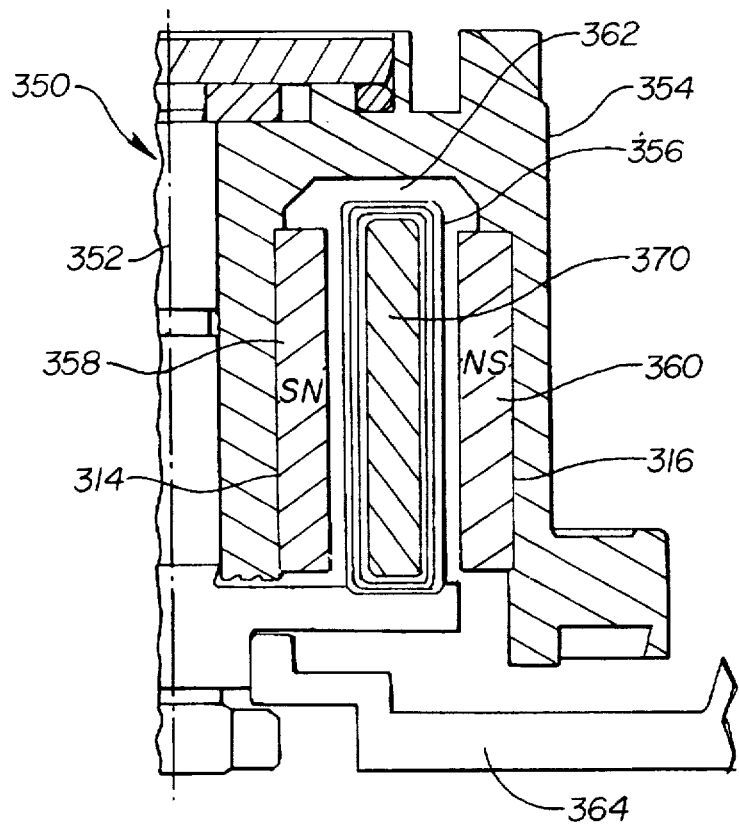
FIG. 17 is a partial sectional view of a hydrodynamic bearing spindle motor having two rotor magnets and an alternative stator winding.

FIG. 17 is a partial sectional view of a disc drive spindle motor having two rotor magnets and an alternative stator winding. Spindle motor 350 includes a central axis 352, a hub 354, an ironless stator winding 356, and rotor magnets 358 and 360. Hub 354 has an internal cavity 362 with an inner diameter 314 and an outer diameter 316. Rotor magnet 358 is attached to inner diameter 314. Rotor magnet is attached to outer diameter 316. Stator winding 356 has a radial position with respect to central axis 352 that is external to rotor magnet 358 and internal to rotor magnet 360. Stator winding 356 is fixed with respect to a housing 364.

Figure 18A:
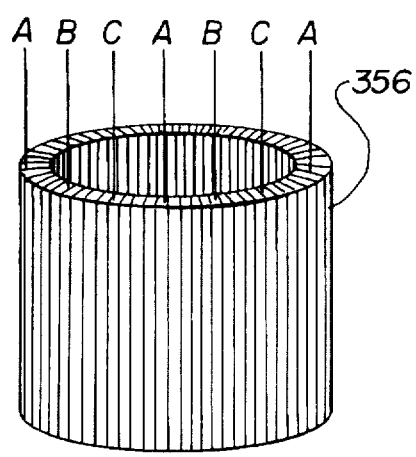
FIG. 18a is a perspective view of the alternative stator winding shown in FIG. 17.
Figure 18B:
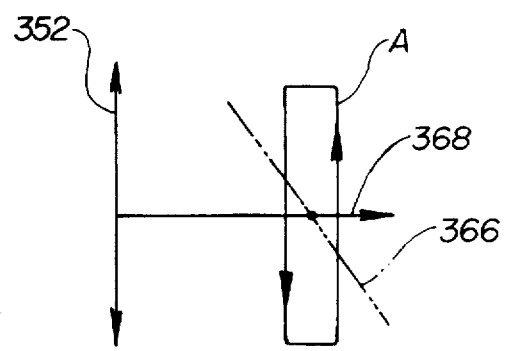

FIG. 18a is a perspective view of stator winding 356. Stator winding 356 is a "Gramme" winding which has a cylindrical shape and is formed of a plurality of phase windings A, B and C. Each phase winding is formed of a plurality of wire loops which are substantially parallel with central axis 352, as shown in FIG. 18b. Each loop has a loop axis 366 that is substantially perpendicular to a radius 368 of spindle motor 350. The primary directions of current flow through the loops are parallel to central axis 352.

Rotor magnets 358 and 360 (shown in FIG. 17) are multiple pole magnets which are arranged such that each corresponding pole has the same polarity facing stator winding 356. For example, the magnet poles shown in FIG. 17 are oriented such that the north poles face stator winding 356. With this orientation, the magnetic field generated by each wire loop of stator winding 356 has the same direction of force on rotor magnets 358 and 360.

In an alternative, non-ironless embodiment, stator winding 356 is wound around a cylindrical stack lamination. The stack lamination would be positioned within area 366 of FIG. 17.

CONCLUSION

The combination of the hydrodynamic bearing and the "ironless" stator in the present invention reduces the forcing functions that give rise to pure tone vibrations. It has been found through experiments that pure tone vibrations become more noticeable in hydrodynamic spindle motors since the background vibration level is lower than in spindle motors having ball bearings. The pure tone vibrations are no longer hidden in the background.

The ironless stator winding reduces excitation of the pure tone vibrations since it has lower permeance variations. The stator winding is not wound around teeth on the stator core as in the prior art. Rather, the stator windings are attached to a back-iron which has a uniform shape. As a result, the back-iron has less magnetic permeance variation than does a stator core having teeth for individual windings. With lower permeance variations, the electromagnetic disturbances in the stator and rotor occur at higher frequencies and therefore have less significant effects on axial and radial vibrations. This also results in smoother torque performance.

Also, the hydrodynamic bearings have a low-profile which allows the stator and rotor to be optimized to operate more efficiently. For example, the efficiency can be increased by incorporating thicker winding coils or a higher energy magnet while maintaining the same outer dimension of the spindle motor. In addition, the flux density is expected to be lower in the back-iron so that the back-iron can be formed somewhat thinner to allow even more space for a larger stator winding.

Although the present invention has been described with reference to preferred embodiments, workers skilled in the art will recognize that changes may be made in form and detail without departing from the spirit and scope of the invention. For example, the ironless spindle motor of the present invention can have a fixed shaft or a rotating shaft. In a rotating shaft spindle motor, the bearing is located between the rotating shaft and an outer stationary sleeve which is coaxial with the rotating shaft. In addition, the stator can be positioned at various locations along the central axis, such as within the hub or below the hub. The stator can have a radial position which is either internal to the hub or external to the hub. Also, various stator winding configurations in can be used in any of the embodiments discussed above, with the present invention.

What is claimed is:

1. A disc drive data storage system, comprising:
   a housing;
   a central axis;
   a stationary member which is fixed with respect to the housing and coaxial with the central axis;
   a rotatable member which is rotatable about the central axis with respect to the stationary member;
   a hydrodynamic bearing interconnecting the rotatable member with the stationary member;
   at least one data storage disc attached to and coaxial with the rotatable member;
   at least one magnet attached to the rotatable member; and
   a stator winding which is fixed with respect to the housing and is coaxial with the rotatable member, wherein the stator winding has an ironless structure which is magnetically coupled to the magnet such that the stator winding and the hydrodynamic bearing cooperate to reduce excitation of pure tone vibrations in the disc drive data storage system.

2. The disc drive data storage system of claim 1 wherein the ironless stator winding has a radial position that is external to the magnet, with respect to the central axis, and has a common axial position with the magnet along the central axis.

3. The disc drive data storage system of claim 1 wherein the ironless stator winding has a radial position that is internal to the magnet, with respect to the central axis, and has a common axial position with the magnet along the central axis.

4. The disc drive data storage system of claim 1 wherein the ironless stator winding is magnetically coupled to the magnet in a radial direction and has an axial position that is below the rotatable member, with respect to the central axis.

5. The disc drive data storage system of claim 1 wherein the ironless stator winding has an axial position that is within the rotatable member, with respect to the central axis.

6. The disc drive data storage system of claim 1 wherein the ironless stator winding comprises a plurality of phase windings, wherein each phase winding is formed of at least one coil having a coil axis that is generally normal to and intersects the central axis of the disc drive data storage system.

7. The disc drive data storage system of claim 1 wherein the ironless stator winding has a cylindrical shape which is formed of a plurality of interwoven phase windings and is coaxial with the rotatable member.

8. The disc drive data storage system of claim 1 wherein the magnet is formed in a unitary, multipolar ring of magnetized material, which is attached to and coaxial with the rotatable member.

9. The disc drive data storage system of claim 1 wherein the magnet is formed of a plurality of individual magnets which are attached to and arranged coaxial with the rotatable member.

10. The disc drive data storage system of claim 1 wherein:
    the rotatable member includes a hub having an outer diameter;
    the magnet is attached to the outer diameter of the hub;
    the ironless stator winding has a radial position with respect to the central axis that is external to the magnet and has an axial position along the central axis that is common with the magnet and below the hub and the hydrodynamic bearing; and
    the system further comprises a magnetic field focusing member which is positioned radially external and magnetically coupled to the ironless stator winding with respect to the central axis.

11. The disc drive data storage system of claim 1 wherein:
    the rotatable member includes a hub having an internal cavity with an inner diameter and an outer diameter;
    the magnet is attached to the outer diameter of the internal cavity;
    the ironless stator winding has a radial position with respect to the central axis that is internal to the magnet and has an axial position along the central axis that is within the internal cavity of the hub; and
    the system further comprises a magnetic field focusing member which is attached to the ironless stator winding and positioned internal to the ironless stator winding with respect to the central axis.

12. The disc drive data storage system of claim 1 and further comprising:
    a magnetic field focusing member which is formed of a magnetic material; and
    wherein the ironless stator winding has a radial position between the focusing member and the magnet with respect to the central axis and is magnetically coupled to the magnetic field focusing member for focusing a magnetic field between the ironless stator winding and the magnet.

13. The disc drive data storage system of claim 12 wherein the magnetic field focusing member is formed of a solid magnetic material.

14. The disc drive data storage system of claim 12 wherein the magnetic field focusing member is formed of a plurality of laminations of magnetic material.

15. The disc drive data storage system of claim 12 wherein the magnetic field focusing member is formed in a unitary ring.

16. The disc drive data storage system of claim 12 wherein:
    the ironless stator winding comprises a plurality of phase windings arranged about the rotatable member; and the magnetic field focusing member includes a plurality of associated individual focusing members, wherein each of the plurality of focusing members is attached to one of the plurality of phase windings.

17. The disc drive data storage system of claim 1 wherein:

the rotatable member includes a hub having an internal cavity with an inner diameter and an outer diameter;

the magnet is attached to the inner diameter of the internal cavity; and the ironless stator winding has a radial position with respect to the central axis that is external to the magnet and internal to the outer diameter of the internal cavity, and the winding has an axial position along the central axis that is within the internal cavity of the hub and common with the magnet.

18. The disc drive data storage system of claim 17 and further comprising a magnetic field focusing member which has a radial position that is external to the ironless stator winding with respect to the central axis and is magnetically coupled to the ironless stator winding for focusing a magnetic field between the ironless stator winding and the magnet.

19. The disc drive data storage system of claim 1 wherein:

the rotatable member includes a hub having an internal cavity with an inner diameter and an outer diameter;

the magnet includes a first magnet attached to the inner diameter of the internal cavity and a second magnet attached to the outer diameter of the internal cavity; and the ironless stator winding has a radial position with respect to the central axis that is external to the first magnet and internal to the second magnet, and the winding has an axial position along the central axis that is within the internal cavity of the hub.

20. The disc drive data storage system of claim 19 wherein the ironless stator winding has a cylindrical shape which is formed of a plurality of interwoven phase windings and is coaxial with the hub.

21. The disc drive data storage system of claim 19 and further comprising a radius extending from the central axis and being perpendicular to the central axis, wherein the ironless stator winding has a cylindrical shape which is formed of a plurality of phase windings, the phase windings being formed of wire loops which have a loop axis that is perpendicular to the radius and to the central axis.

22. The disc drive data storage system of claim 1 wherein:

the rotatable member includes a hub having an internal cavity with an inner diameter and an outer diameter;

the at least one magnet includes a first magnet positioned at the inner diameter of the internal cavity and a second magnet positioned at the outer diameter of the internal cavity;

the ironless stator winding has a radial position with respect to the central axis that is external to the first magnet and internal to the second magnet, and the winding has an axial position along the central axis that is within the internal cavity of the hub;

an overmold flowed over the ironless stator winding; and the hydrodynamic bearing has a first bearing surface formed by the first magnet and a second bearing surface formed by the overmold.

23. A disc drive data storage system, comprising:

a housing;

a central axis;

a hub which is rotatable with respect to the central axis;

at least one data storage disc attached to and coaxial with the hub;

a magnet which is carried by the hub;

a stator winding which is fixed with respect to the housing;

an overmold flowed over the stator winding;

a hydrodynamic bearing having a first radial bearing surface formed by the magnet and a second radial bearing surface formed by the overmold; and wherein the stator winding has an ironless structure which is magnetically coupled to the magnet such that the stator winding and the hydrodynamic bearing cooperate to reduce excitation of pure tone vibrations in the disc drive data storage system.

24. A hydrodynamic bearing spindle motor for a disc drive data storage system, comprising:

a central axis;

a housing;

a stationary member which is fixed with respect to the housing;

hub means for carrying at least one data storage disc and rotating the disc with respect to the central axis in response to a rotating magnetic field;

hydrodynamic bearing means for interconnecting the hub means with the stationary member; and ironless stator winding means for generating the rotating magnetic field such that the ironless stator winding means and the hydrodynamic bearing means cooperate to reduce excitation of pure tone vibrations in the hydrodynamic bearing spindle motor.

* * * * *